United States Patent [19]

Kolchinsky

[11] Patent Number: 5,072,752
[45] Date of Patent: Dec. 17, 1991

[54] BIDIRECTIONAL CARTRIDGE VALVE

[75] Inventor: Abel E. Kolchinsky, Riverwoods, Ill.

[73] Assignee: Sterling Hydraulics, Inc., Schaumburg, Ill.

[21] Appl. No.: 669,529

[22] Filed: Mar. 14, 1991

[51] Int. Cl.⁵ .............................................. G05D 16/10
[52] U.S. Cl. .................................... 137/493; 137/491; 137/492.5
[58] Field of Search ............ 137/493, 491, 492, 492.5; 251/30.01; 138/40

[56] References Cited

U.S. PATENT DOCUMENTS

| | | | |
|---|---|---|---|
| 2,364,602 | 12/1944 | Comer | 138/40 |
| 2,470,470 | 5/1949 | Carbon . | |
| 2,480,712 | 8/1949 | Carbon . | |
| 2,952,071 | 9/1960 | Burt | 138/40 X |
| 3,154,285 | 10/1964 | Houle . | |
| 3,405,906 | 10/1968 | Keller . | |
| 4,305,566 | 12/1981 | Grawunde . | |
| 4,364,410 | 12/1982 | Chow | 137/493 X |
| 4,494,726 | 1/1985 | Kumar et al. . | |
| 4,544,128 | 10/1985 | Kolchinsky | 251/30.01 |
| 4,592,533 | 6/1986 | Guglielmi | 251/30.01 |
| 4,679,586 | 7/1987 | Riedel | 137/493 X |
| 4,679,765 | 7/1987 | Kramer et al. . | |

FOREIGN PATENT DOCUMENTS

| | | | |
|---|---|---|---|
| 0204666 | 12/1986 | European Pat. Off. . | |
| 900738 | 7/1962 | United Kingdom . | |
| 901061 | 7/1962 | United Kingdom | 137/493 |
| 940469 | 10/1963 | United Kingdom | 137/493 |
| 945328 | 12/1963 | United Kingdom | 137/493 |

*Primary Examiner*—Alan Cohan
*Attorney, Agent, or Firm*—Wood, Phillips, Mason, Recktenwald & Van Santen

[57] ABSTRACT

A bidirectional cartridge valve comprises a generally cylindrical valve housing including an end port and a side port each opening into an axial, cylindrical bore defining a valve chamber. A flow control element is movable in the valve chamber between a valve open position to open a flow path between the two ports and a valve closed position to block the flow path between the two ports. The flow control element includes a first passage provided with a first check valve connecting the end port with the valve chamber and a second passage with a second check valve connecting the side port with the valve chamber. A cylindrical pilot seat in the chamber includes a partial, axial bore defining a pilot chamber and an opening through the seat connecting the valve chamber with the pilot chamber. A third passage is provided through the valve housing, provided with a third check valve, connecting the pilot chamber to the side port. A fourth passage is provided through the valve housing connecting the pilot chamber to the valve chamber at a select axial position occupied by the flow control element. A fifth passage is provided through the flow control element, provided with a fourth check valve, connecting the valve chamber at the select axial position to the end port to provide a fluid path in communication with the fourth passage. A pilot valve is movable in the pilot chamber between a pilot valve open position to open a flow path between the valve chamber and the pilot chamber whereby fluid pressure at either of the two ports causes the flow control element to move in the valve open position, and a pilot valve closed position to block a flow path between the valve chamber and the pilot chamber whereby fluid pressure in the valve chamber exceeds fluid pressure at both ports to maintain the flow control element in the closed position.

15 Claims, 6 Drawing Sheets

BIDIRECTIONAL CARTRIDGE VALVE

FIELD OF THE INVENTION

This invention relates to valves and, more particularly, to bidirectional, solenoid operated cartridge valves.

BACKGROUND OF THE INVENTION

In one form of a fluid control valve, a flow control element is movably positioned in a valve chamber to open or close the valve. The flow control element may be directly actuated by a solenoid operated plunger operatively associated with the flow control element. The solenoid coil controllably positions the plunger to move the flow control element to an actuated position. To avoid a requirement for high powered solenoids, certain flow control valves further include a pilot valve operatively disposed between the plunger and the flow control element. The pilot valve must overcome lesser hydraulic forces, thus requiring a lower power solenoid.

With a unidirectional valve, the flow control valve operates correctly if fluid flow is in only a single direction, i.e., from an inlet port to an outlet port. In certain applications it is desirable to use a bidirectional valve to control fluid flow in either direction. Bidirectional valves incorporating a Wheatstone bridge concept provide suitable control.

One known bidirectional control valve uses a flow control element including four internal passages each having a check valve. European Patent No. 0 204 666 discloses such a valve. A common passage connects two unloading passages to provide a pilot opening opened or blocked by a solenoid operated needle. Such a structure requires that the solenoid operated needle have sufficient stroke to permit sufficient movement of a plunger. This requires a higher power solenoid.

Carbon U.S. Pat. No. 2,480,712 discloses a bidirectional fluid flow control valve that uses a pilot valve having a pilot chamber separate from a valve chamber. Such a valve cannot fit into existing or standard cavities such as in a manifold.

The present invention overcomes one or more of the problems discussed above.

DESCRIPTION OF THE INVENTION

According to the invention a bidirectional cartridge valve includes a pilot control valve.

Broadly, there is disclosed herein a bidirectional cartridge valve comprising a generally cylindrical valve housing including an end port and a side port each opening into an axial, cylindrical bore defining a valve chamber. A flow control element is movable in the valve chamber between a valve open position to open a flow path between the two ports and a valve closed position to block the flow path between the two ports. The flow control element includes a first passage provided with a first check valve connecting the end port with the valve chamber and a second passage with a second check valve connecting the side port with the valve chamber. A cylindrical pilot seat in the chamber includes a partial, axial bore defining a pilot chamber and an opening through the seat connecting the valve chamber with the pilot chamber. A third passage is provided through the valve housing, provided with a third check valve, connecting the pilot chamber to the side port. A fourth passage is provided through the valve housing, provided with a fourth check valve, connecting the pilot chamber to the end port. A pilot valve is movable in the pilot chamber between a pilot valve open position to open a flow path between the valve chamber and the pilot chamber by which fluid pressure at either of the two ports causes the flow control element to move in the valve open position, and a pilot valve closed position to block a flow path between the valve chamber and the pilot chamber by which fluid pressure in the valve chamber exceeds fluid pressure at both ports to maintain the flow control element in the closed position.

In one aspect of the invention, each passage comprises an elongate circular bore including a narrow section connected via a shoulder to an enlarged section and each check valve comprises a ball in the enlarged section between the shoulder and a restrictor mounted in the enlarged portion, the restrictor including means for providing free reverse flow.

It is a feature of the invention that the restrictor comprises a cylindrical pin including a flattened side to provide free reverse flow.

According to another aspect of the invention a reciprocally movable solenoid plunger is operatively associated with the pilot valve for positioning the pilot valve.

According to another aspect of the invention a biasing means normally urges the pilot valve to the open position.

According to yet a further aspect of the invention a biasing means normally urges the pilot valve to the closed position.

More specifically, there is disclosed herein a bidirectional cartridge valve comprising a generally cylindrical valve housing including an end port and a side port each opening into an axial, cylindrical bore defining a valve chamber. A flow control element is movable in the valve chamber between a valve open position to open a flow path between the two ports and a valve closed position to block the flow path between the two ports. The flow control element includes a first passage provided with a first check valve connecting the end port with the valve chamber and a second passage with a second check valve connecting the side port with the valve chamber. A cylindrical pilot seat in the chamber includes a partial, axial bore defining a pilot chamber and an opening through the seat connecting the valve chamber with the pilot chamber. A third passage is provided through the valve housing, provided with a third check valve, connecting the pilot chamber to the side port. A fourth passage is provided through the valve housing connecting the pilot chamber to the valve chamber at a select axial position occupied by the flow control element. A fifth passage is provided through the flow control element, provided with a fourth check valve, connecting the valve chamber at the select axial position to the end port to provide a fluid path in communication with the fourth passage. A pilot valve is movable in the pilot chamber between a pilot valve open position to open a flow path between the valve chamber and the pilot chamber by which fluid pressure at either of the two ports causes the flow control element to move in the valve open position, and a pilot valve closed position to block a flow path between the valve chamber and the pilot chamber by which fluid pressure in the valve chamber exceeds fluid pressure at both ports to maintain the flow control element in the closed position.

It is a feature of the invention that the flow control element includes first and second peripheral seals at opposite longitudinal positions relative to the select position to provide a sealed fluid flow path between the fourth and fifth passages.

It is another feature of the invention that the valve housing includes an annular groove in the bore at the select axial position to connect the fourth and fifth passages.

According to a further aspect of the invention means are included for limiting axial movement of the pilot valve to a fixed, relatively short distance, which such distance is less than axial movement of the flow control element.

Further features and advantages of the invention will readily be apparent from the specification and from the drawings.

DETAILED DESCRIPTION OF THE INVENTION

Figure 1:
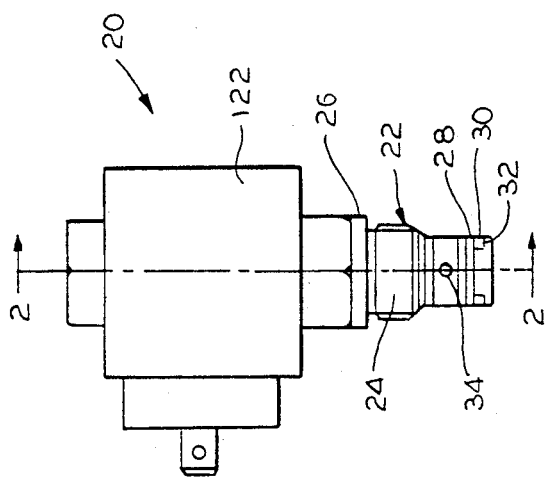
FIG. 1 is a perspective view of a normally closed bidirectional cartridge valve embodying the invention.

FIG. 1 illustrates a solenoid operated bidirectional cartridge valve 20 according to the invention. The valve 20 includes a stationary valve housing 22 having a threaded outer portion 24 adapted to be threaded into a fluid port (not shown). First and second sealing rings 26 and 28 are provided on the valve housing 22 for sealing the valve 20 within the fluid port. A backup ring 30 is provided on either side of the sealing ring 28 in an annular recess 32 in the valve housing 22.

Figure 2:
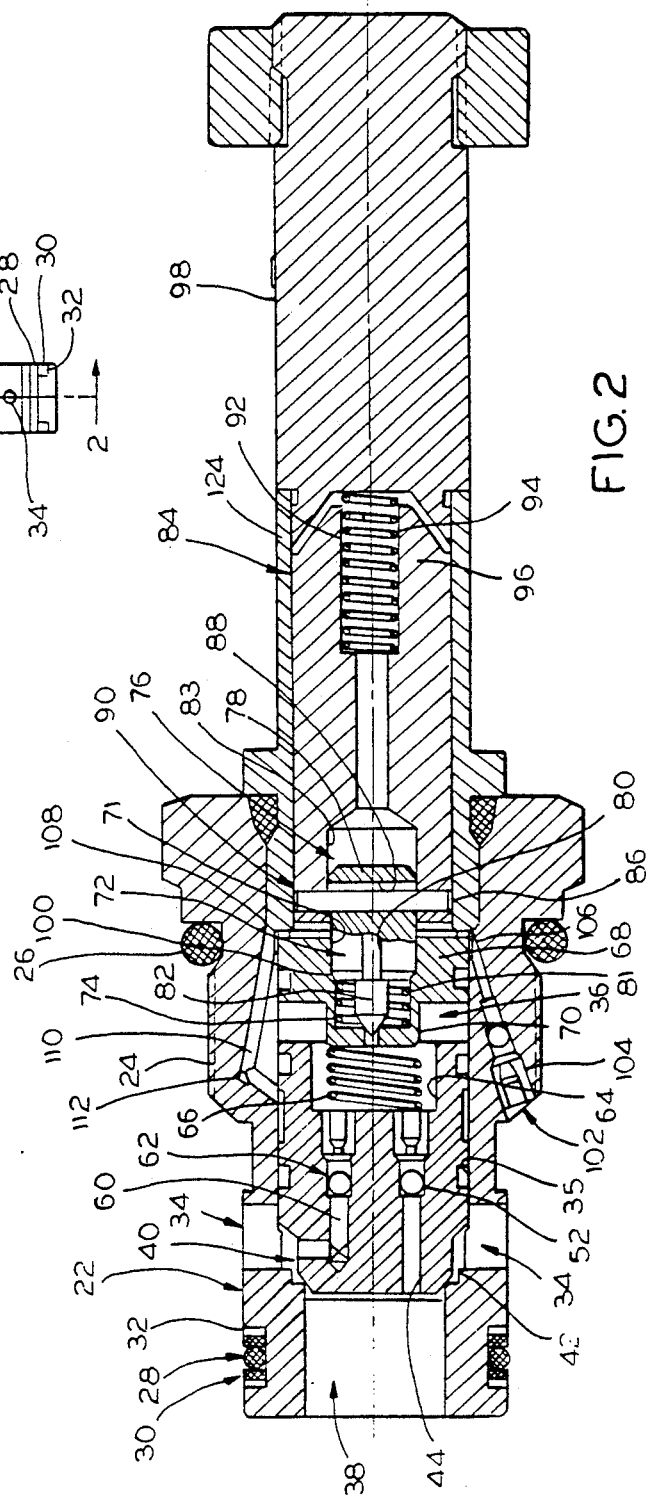
FIG. 2 is a sectional view taken along the line 2—2 of FIG. 1, the solenoid coil being omitted for clarity.
Figure 3:
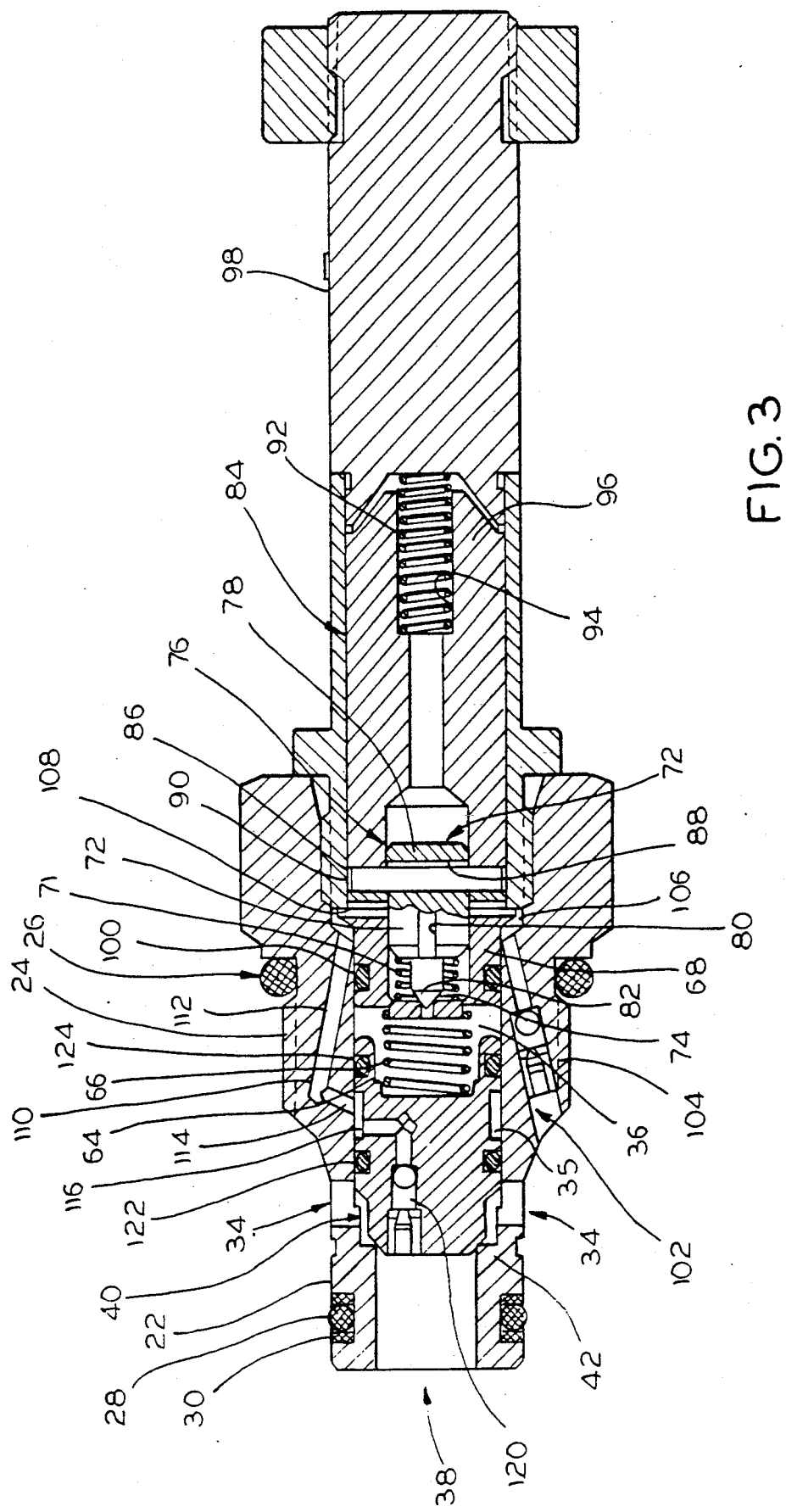
FIG. 3 is a view similar to that of FIG. 2 with a poppet rotated 90°.

With reference also to FIGS. 2 and 3, the valve housing 22 is provided with a plurality of circumferentially spaced side ports or openings 34 that open radially inwardly into an axial cylindrical bore 35 through the valve housing 22 defining a valve chamber 36. An outer end of the bore 35 comprises an end port 38.

As used herein, the relative term "outer" or "outward" refers to a direction axially toward the outlet port 38, i.e., to the left in the figures, and the relative term "inner" or "inward" refers to a direction axially away from the outlet port 38. i.e., rightward in the figures.

A flow control element as a poppet 40 is movable in the valve chamber 36 between a valve open position to open a flow path between the two ports 34 and 38 and a valve closed position to block the flow path between the two ports 34 and 38. In the valve closed position, an annular valve seat 42 seats the poppet 40 at the inner end of the outlet port 38.

Figure 4:
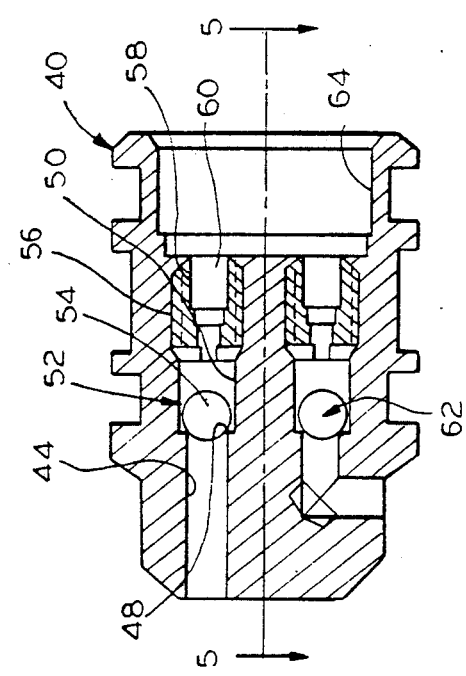
FIG. 4 is a sectional view of the poppet of the valve of FIG. 1.
Figure 5:
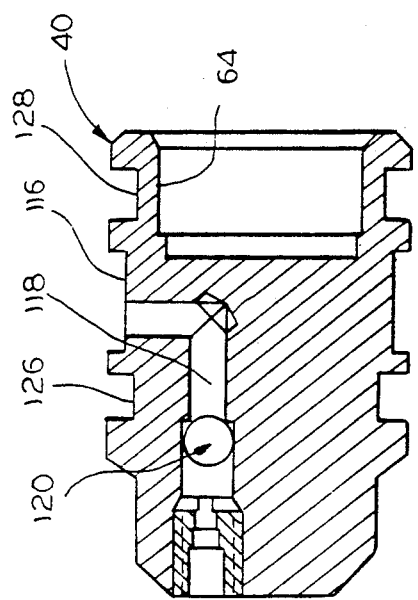
FIG. 5 is a sectional view taken along the line 5—5 of FIG. 4.

The poppet 40, see also FIGS. 4 and 5, includes a first bore or passage 44 extending axially therethrough connecting the end port 38 with the valve chamber 36. The passage 44 includes a counterbore 50 at its inner end defining a shoulder 48. The passage 44 includes a check valve 52. The check valve 52 comprises a ball 54 in the counterbore 58 between the shoulder 48 and a restrictor 56 mounted in the counterbore 50. In the illustrated embodiment, the restrictor 56 comprises a set screw 58 including a restrictor opening as an axial bore 60 opening to a transverse slot 61. The bore 60 is of a small enough diameter, at its narrowest section, to provide a suitable pressure drop from the port 38 to the chamber 36. The check valve 52 prevents flow from the valve chamber 36 to the end port 38 as by the ball 54 seating on the shoulder 48. Flow from the end port 38 to the valve chamber 36 is permitted as the transverse slot 61 prevents the ball from seating to close the restrictor opening 60.

The poppet 40 includes a second passage 63 connecting the side port 34 with the valve chamber 36. The passage 63, which is L-shaped, opens through a sidewall of the poppet 40 at an axial position corresponding to that of the side port 34. The passage 63 includes a check valve 62, similar to the check valve 52 using an additional restrictor 56. The check valve 62 permits fluid flow only from the side port 34 to the valve chamber 36, and not vice versa.

The poppet 40 also includes an axial, inwardly opening counterbore 64. A coil spring 66 received in the counterbore 64 abuts a cylindrical pilot seat 68. The pilot seat 68 includes an outer nose portion 70 aligned with the poppet counterbore 64 and includes an axial, inwardly opening counterbore 71 defining a pilot chamber 72. An axial pilot opening 74 through the pilot seat nose section 70 connects the valve chamber 36 with the pilot chamber 72.

The pilot opening 74 is normally closed by a pilot valve 76 having a slide portion 78 slidably received in the pilot chamber 72. The slide portion 78 includes a radially outer, longitudinally extending groove 80 that provides fluid communication between a transfer chamber 81 and the pilot valve chamber 72. The pilot valve 76 includes a needle valve 82 extending outwardly from the slide portion 78 to open or close the opening 74.

The pilot valve slide portion 78 acts as a pilot guide and includes an inner end received in an axial counterbore 83 at an outer end of a solenoid plunger 84. The plunger 84 includes a radially extending through bore 86 at the counterbore end. A dowel pin 90 extends through the plunger bore 86 and a pilot valve radial through bore 88 to operatively connect the plunger 84 and the pilot valve 76. As illustrated, the pin 90 has an outer diameter somewhat less than an inner diameter of the pilot valve bore 88 to provide for limited relative axial movement between the plunger 84 and the pilot valve 76.

In a normally closed arrangement of the valve 20, a helical coil spring 92, acting between an inner counterbore 94 at the plunger inner end 96 and a plug 98, biases the plunger 84 outwardly. A coil spring 98 received in the transfer chamber 81 biases the pilot valve 76 inwardly. Yet, the bias of the coil spring 92 is greater than that of the coil spring 100 to urge the pilot valve 76 outwardly into the seated arrangement of FIGS. 2 and 3 to close the pilot opening 84.

As further illustrated in FIGS. 2 and 3, the valve housing 24 includes a third passage 102 including a check valve 104 connecting the pilot chamber 72 to the side port 34. Particularly, the passage 102 opens to an annular space 106 inwardly of the pilot seat 68. A space 108 between the pilot seat 68 and the plunger 84 provides communication into the pilot chamber 72. The check valve 104 is similar to the check valve 52, see FIG. 4, and is operable to prevent fluid flow from the side port 34 to the pilot chamber 72 but to allow flow in the reverse direction. The check valve 104 may use a set screw having a larger diameter axial bore as the bore serves as a drain opening, and not a restrictor opening.

An additional passage 110 provides fluid flow from the pilot chamber 72 to the end port 38. The passage 110 comprises a fourth passage 112 extending from the annular space 106 and opening to the valve chamber 36 at a select axial position 114. With reference to FIG. 5, the poppet 40 includes an outer circumferential groove 116 at the select radial position. The groove 116 opens to fifth passage 118 extending through the poppet 40 connecting the groove 116 to the end port 38, see FIG. 3. The passage 118, which is L-shaped, includes a check valve 120, similar to the check valve 104, discussed above. The check valve 120 permits fluid flow from the groove 116 to the end portion 38, but not vice versa. A pair of 0-rings 122 and 124 are received in outer circumferential grooves 126 and 128, respectively, on opposite sides of the groove 116. The 0-rings 122 and 124 provide a sealed fluid flow path between the fourth passage 112 and the fifth passage 118.

Under normal operating conditions, the pilot valve 76 closes off the pilot opening 74. Assuming the end port 38 is acting as the inlet, then fluid flows from the end port 38 through the first passage 44 into the valve chamber 36. The outwardly directed force of the coil spring 66 and the fluid acting on the inner end of the poppet 40 exceeds the pressure at the outer end of the poppet 40, resulting in the poppet 40 remaining seated on the valve seat 42. The poppet second passage 60 remains closed by the check valve 62.

A solenoid coil 122, see FIG. 1, surrounds the plug 98 and a tube 124 connecting the plug 98 to the valve housing 22. Energization of the solenoid coil 122 causes the plunger 84 to move inwardly a select distance determined by the spacing between the plunger 84 and the plug 98. Such movement causes the pilot valve 76 to move a select relatively short minimal distance that is sufficient to remove the needle valve 82 from the pilot opening 74 to open a flow path between the valve chamber 36 and through the transfer chamber 81 to the pilot chamber 72. The fluid in the pilot chamber 72 drains via the third passage 102 to the side port 34. Resultantly, the fluid pressure at the end port 38 overcomes the pressure of the coil spring 66 and the lifting force moves the poppet 40 inwardly to provide fluid flow between the end port 38 and the side port 34.

In the event that flow reverses, then operation continues normally owing to the Wheatstone bridge configuration provided by the passages and the associated check valves, see FIG. 1B. Under reverse flow conditions, with the side port 34 being under higher pressure, fluid flows from the side port 34 through the poppet second passage 63 into the valve chamber 36. Under such circumstances, the fourth passage 110 through the valve housing 22 and the fifth passage 118 through the poppet 40 acts as a drain passage for fluid in the pilot chamber 72.

Thus, according to the invention, a cartridge valve 20 provides for bidirectional reversible flow. Further, by using the pilot seat 68 incorporating a pilot chamber 72, the solenoid plunger 84 need only provide limited axial movement of the needle valve 82. This requires a relatively lower rated solenoid independent of fluid pressure and poppet stroke. The poppet 40 can be configured to move a select greater axial distance as determined by the spacing between the poppet 40 and the pilot seat 68. This allows the poppet 40 to be moved as far as necessary to provide a larger opening while using a limited pilot stroke. Thus, a smaller coil 122 can be used for a larger size valve with the pilot assembly always being the same despite valve size.

The use of the passage 112 through the valve housing 102 and connected via a sealed connection to the passage 118 through the poppet 120, allows structure incorporating a separate pilot chamber 72 and valve chamber 36 to be incorporated into a cartridge valve where a flow passage must be provided between the pilot chamber 72 and the end port 38.

Figure 6:
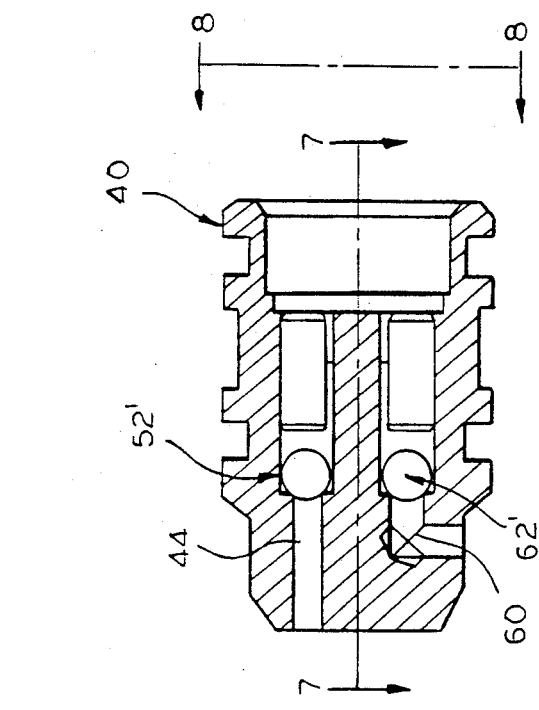
FIG. 6 is a sectional view similar to that of FIG. 4 showing an alternative embodiment of a check valve and restrictor.
Figure 7:
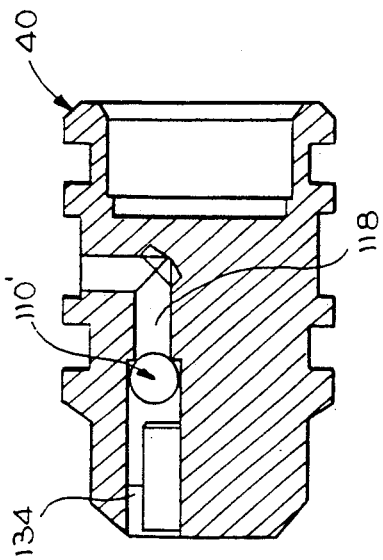
FIG. 7 is a sectional view taken along the line 7—7 of FIG. 6.
Figure 10:
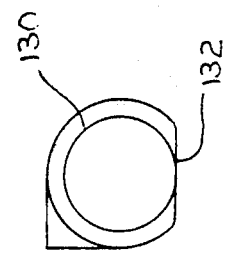
FIG. 10 is an end view taken along the line 10—10 of FIG. 9.
Figure 9:
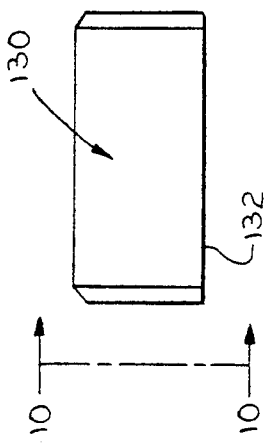
FIG. 9 is an elevational view of the check valve restrictor used in the poppet of FIG. 6.
Figure 8:
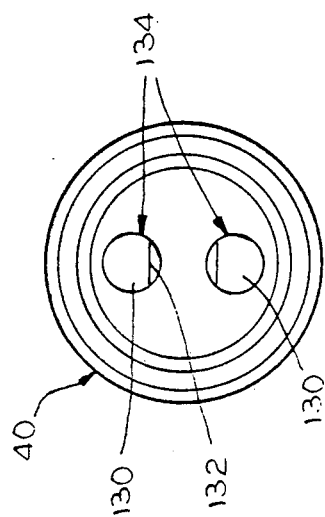
FIG. 8 is an end view taken along the line 8—8 of FIG. 6.

FIGS. 6 and 7 illustrate a poppet valve 40 using check valves 52', 62' and 120'. Each check valve, represented by a primed reference numeral, differs from the check valves shown in FIGS. 4 and 5 with unprimed reference numerals, in the use of a different restrictor 56'. In the embodiment shown in FIGS. 4 and 5, the restrictor 56 comprised a set screw 58 including a restrictor opening 60 connected to a transverse slot 61. According to the embodiment disclosed in FIGS. 6 and 7, the restrictor 56' comprises a cylindrical pin 130, see FIGS. 9 and 10, having a flattened side 132. With the pin 130 mounted in one of the passages, a space 134 between the flattened side 132 and the wall of the associated bore acts as an orifice. The space 134 is sized to be relatively small for the restrictor check valves 52' and 62' and larger for the drain check valve 120', and also the third passage check valve, not shown.

Figure 11:
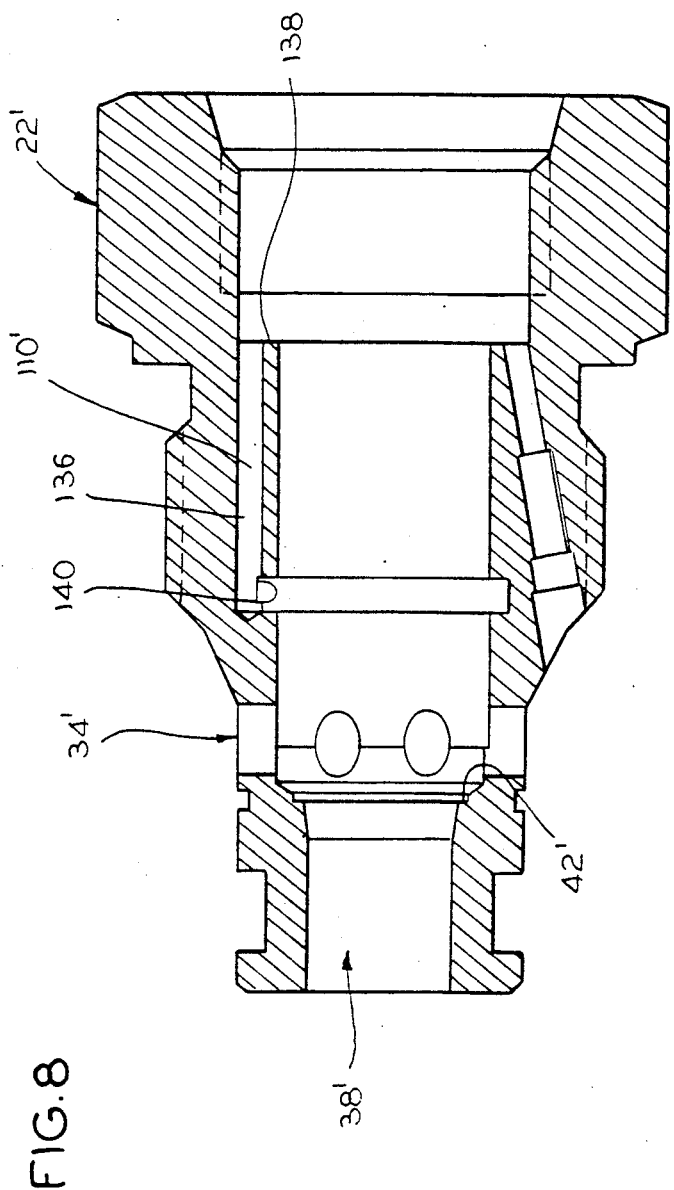
FIG. 11 is a sectional view showing a valve housing according to an alternative embodiment of the invention.

FIG. 11 illustrates a valve housing 22' according to an alternative embodiment of the invention. The valve seat 22' is almost identical with the valve housing 22 discussed above. For simplicity, like, primed reference numerals represent elements identical with like unprimed numerals discussed above.

The difference in the alternative valve housing 22' is in the orientation of the fourth passage 110'. In the embodiment shown above, the passage 110 consisted of diagonal, intersecting bores. In the embodiment of FIG. 11, the passage 110' comprises an axially extending passage 136 between an inner shoulder 138 and a radially inwardly opening annular groove 140. The annular groove 140 is at the select axial position corresponding to that occupied by the poppet groove 116.

Figure 12:
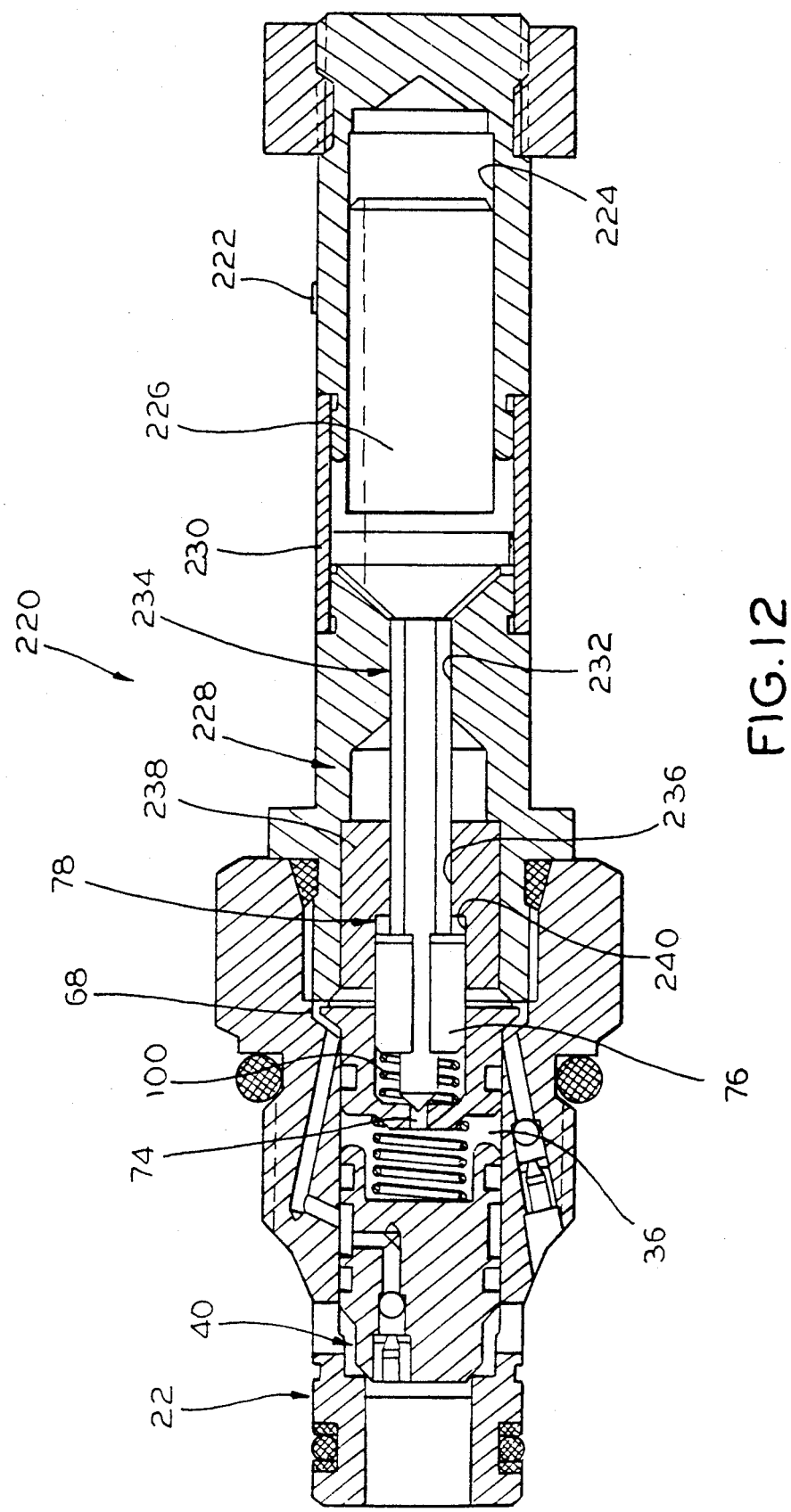
FIG. 12 is a view similar to that of FIG. 3 illustrating a normally open bidirectional cartridge valve embodying the invention, the solenoid coil being omitted for clarity.

The cartridge valve 20 discussed above comprises a normally closed cartridge valve. With reference to FIG. 12, a normally open cartridge valve 220 is illustrated. The cartridge valve 220 uses a valve housing 22, poppet 40, pilot seat 68 and pilot valve 76 identical with those discussed above. A plug 222 includes a generally cylindrical counterbore 224 housing a plunger 226. A tube stop adapter 228 is connected to the plug 222 using a tube 230 welded to each to sandwich the plunger 226 between the tube stop adapter 228 and the plug 222. The tube stop adapter includes an axial through bore 232. A plug 238 received in the tube stop adapter includes an axial through bore 236. A pin 234 extends through the bores 232 and 236 between the plunger 226 and the pilot valve slide portion 78.

In the normally opened arrangement of the valve 220, the coil spring 100 urges the pilot valve 76 inwardly to open the pilot opening 74. Thus, the poppet 40 is unseated so that the valve 220 is in the normally open position. Energization of the solenoid coil (not shown) urges the solenoid plunger 226 outwardly which pushes the pin 234 into the pilot valve 76 to overcome the force of the spring 100 and thus close the pilot opening 74. With the pilot opening 74 closed, pressure builds up in the valve chamber 36 and the poppet 40 moves outwardly until it is seated to close the valve 220. In all other respects, operation of the valve 220 is similar to that discussed above relative to the valve 20 except being normally open configuration rather than normally closed configuration.

Figure 13:
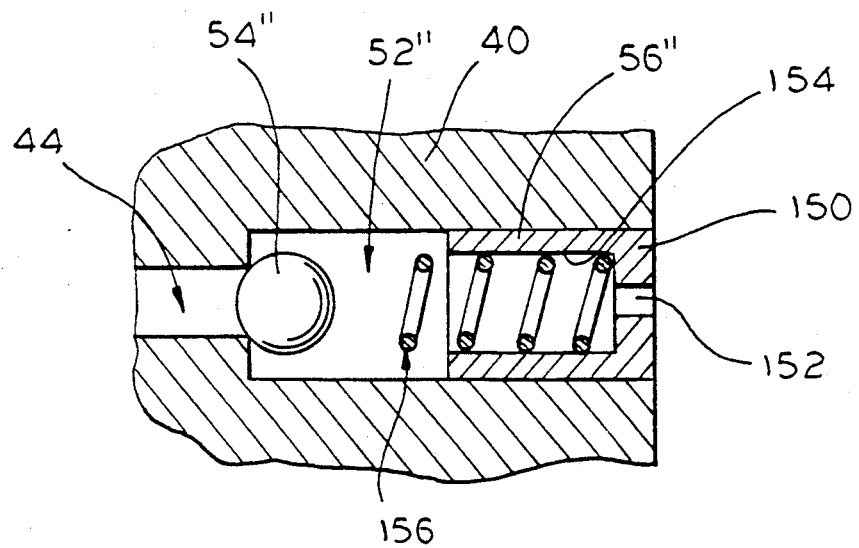
FIG. 13 is a partial, sectional view showing another alternative embodiment of a check valve and restrictor.
Figure 14:
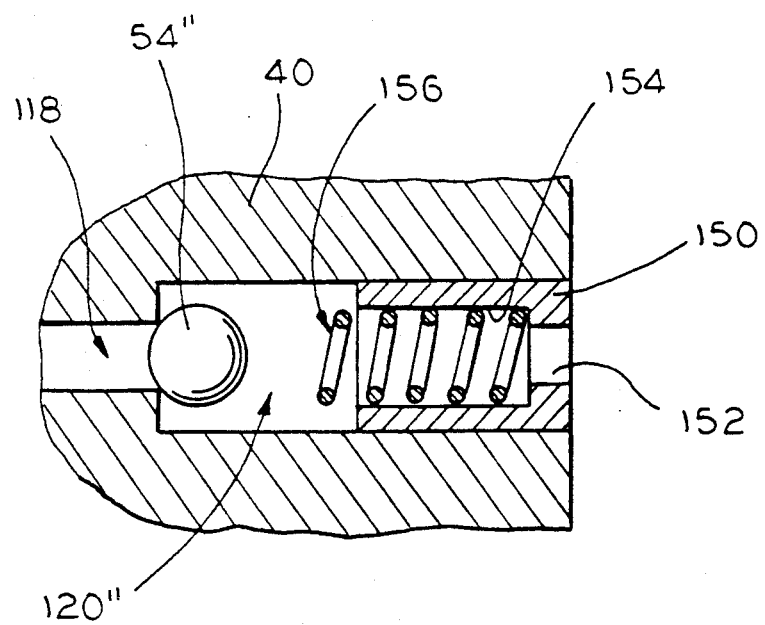
FIG. 14 is a view similar to that of FIG. 13 for a drain check valve.

FIGS. 13 and 14 illustrate a poppet valve 40 using check valves 52″ and 120″. Each check valve, represented by a double primed reference numeral, differs from the check valves shown in FIGS. 4 and 5 with unprimed reference numerals, in the use of a different restrictor 56″. In the embodiment shown in FIGS. 4 and 5, the restrictor 56 comprised a set screw 58 including a restrictor opening 60 connected to a transverse slot. According to the embodiment disclosed in FIG. 13, the restrictor 56″ comprises a cylindrical block 150 having an axial through bore 152 opening to an enlarged counterbore 154. A spring 156 is disposed within the counterbore 154. The spring 156 prevents the ball 54″ from seating. The bore 152 is sized to be relatively small for the restrictor check valve 52′, see FIG. 13, and also the second passage restrictor check valve, not shown. The bore 152 is larger for the drain check valve 120″, see FIG. 14, and also the third passage drain check valve, not shown.

Thus, in accordance with the invention, there is disclosed a bidirectional cartridge valve incorporating the use of separate pilot and valve chambers providing high pressure flow operation using relative low pilot capacity.

I claim:

1. A bidirectional cartridge valve comprising:
 - a generally cylindrical valve housing including an end port and a side port each opening into an axial, cylindrical bore defining a valve chamber;
 - a flow control element movable in said valve chamber between a valve open position to open a flow path between the two ports and a valve closed position to block the flow path between the two ports, said flow control element including a first passage provided with a first check valve connecting said end port with said valve chamber and a second passage with a second check valve connecting said side port with said valve chamber;
 - a cylindrical pilot seat in said chamber including a partial, axial bore defining a pilot chamber and an opening through said seat connecting said valve chamber with said pilot chamber;
 - a third passage through said valve housing, provided with a third check valve, connecting said pilot chamber to said side port;
 - a fourth passage through said valve housing, provided with a fourth check valve, connecting said pilot chamber to said end port; and
 - a pilot valve movable in said pilot chamber between a pilot valve open position to open a flow path between said valve chamber and said pilot chamber whereby fluid pressure at either of said two ports causes said flow control element to move to the valve open position, and a pilot valve closed position to block a flow path between said valve chamber and said pilot chamber whereby fluid pressure in said valve chamber exceeds fluid pressure at both said ports to maintain said flow control element in said closed position.

2. The bidirectional cartridge valve of claim 1 wherein each said passage comprises an elongate circular bore including a narrow section connected via a shoulder to an enlarged section and each said check valve comprises a ball in said enlarged section between said shoulder and a restrictor mounted in said enlarged portion, said restrictor including means for providing free reverse flow.

3. The bidirectional cartridge valve of claim 2 wherein said restrictor comprises a cylindrical pin including a flatted side to provide free reverse flow.

4. The bidirectional cartridge valve of claim 1 further comprising a reciprocally movable solenoid plunger operatively associated with said pilot valve for positioning said pilot valve.

5. The bidirectional cartridge valve of claim 4 further comprising biasing means for normally urging said pilot valve to said open position.

6. The bidirectional cartridge valve of claim 4 further comprising biasing means for normally urging said pilot valve to said closed position.

7. A bidirectional cartridge valve comprising:
 - a generally cylindrical valve housing including an end port and a side port each opening into an axial, cylindrical bore defining a valve chamber;
 - a flow control element movable in said valve chamber between a valve open position to open a flow path between the two ports and a valve closed position to block the flow path between the two ports, said flow control element including a first passage provided with a first check valve connecting said end port with said valve chamber and a second passage with a second check valve connecting said side port with said valve chamber;
 - a cylindrical pilot seat in said chamber including a partial, axial bore defining a pilot chamber and an opening through said seat connecting said valve chamber with said pilot chamber;
 - a third passage through said valve housing, provided with a third check valve, connecting said pilot chamber to said side port;
 - a fourth passage through said valve housing connecting said pilot chamber to said valve chamber at a select axial position occupied by said flow control element;
 - a fifth passage through said flow control element, provided with a fourth check valve, connecting said valve chamber at the select axial position to said end port to provide a fluid path in communication with said fourth passage; and a pilot valve movable in said pilot chamber between a pilot valve open position to open a flow path between said valve chamber and said pilot chamber whereby fluid pressure at either of said two ports causes said flow control element to move to the valve open position, and a pilot valve closed position to block a flow path between said valve chamber and said pilot chamber whereby fluid pressure in said valve chamber exceeds fluid pressure at both said ports to maintain said flow control element in said closed position.

8. The bidirectional cartridge valve of claim 7 wherein each said passage comprises an elongate circular bore including a narrow section connected via a shoulder to an enlarged section and each said check valve comprises a ball in said enlarged section between said shoulder and a restrictor mounted in said enlarged portion, said restrictor including means for providing free reverse flow.

9. The bidirectional cartridge valve of claim 8 wherein said restrictor comprises a cylindrical pin including a flatted side to provide free reverse flow.

10. The bidirectional cartridge valve of claim 7 further comprising a reciprocally movable solenoid plunger operatively associated with said pilot valve for positioning said pilot valve.

11. The bidirectional cartridge valve of claim 10 further comprising biasing means for normally urging said pilot valve to said open position.

12. The bidirectional cartridge valve of claim 10 further comprising biasing means for normally urging said pilot valve to said closed position.

13. The bidirectional cartridge valve of claim 7 wherein said flow control element includes first and second peripheral seals at opposite longitudinal positions relative to said select position to provide a sealed fluid flow path between said fourth and fifth passages.

14. The bidirectional cartridge valve of claim 7 wherein said valve housing includes an annular groove in said bore at said select axial position to connect said fourth and fifth passages.

15. The bidirectional cartridge valve of claim 7 further comprising means for limiting axial movement of said pilot valve to a fixed, relatively short distance, which such distance is less than axial movement of said flow control element.

* * * * *